United States Patent [19]
Lundvall, I et al.
[11] 4,177,465
[45] Dec. 4, 1979

[54] NEAR-RANGE PERSONNEL BEACON LOCATOR APPARATUS

[75] Inventors: Donald O. Lundvall, I, Papillion; John P. Engels; Robert R. Yesconis, both of Omaha, all of Nebr.

[73] Assignee: The United States of America as represented by the Secretary of the Air Force, Washington, D.C.

[21] Appl. No.: 949,189

[22] Filed: Oct. 6, 1978

[51] Int. Cl.[2] ................ G01S 11/00
[52] U.S. Cl. ................ 343/112 D
[58] Field of Search ................ 343/112 D

[56] References Cited

U.S. PATENT DOCUMENTS

| | | | |
|---|---|---|---|
| 2,571,368 | 10/1951 | Kahn et al. | 343/112 D |
| 4,023,176 | 5/1977 | Currie | 343/112 D |

*Primary Examiner*—Maynard R. Wilbur
*Assistant Examiner*—Richard E. Berger
*Attorney, Agent, or Firm*—Joseph E. Rusz; William Stepanishen

[57] ABSTRACT

A near-range personnel beacon locator apparatus utilizing a tuned tank circuit to receive the emitted signal from an activated personnel beacon. The detected signal is applied to a D.C. amplifier to provide a D.C. level which drives a controlled variable duty cycle timer for driving a light emitting diode indicator.

7 Claims, 4 Drawing Figures 10
12
TUNED TANK
14
DETECTOR
16
LOW-PASS FILTER
18
DC AMPLIFIER
20
TIMER AND LED FLASHER
22
POWER SUPPLY
24
POWER SUPPLY LOW-VOLTAGE TESTER/INDICATOR DETECTOR
LOW PASS FILTER
DC AMPLIFIER
FLASHER
IC1
IC2
B1
S1'
S2
D1
D2
D3
D4
D5
D6
R1
R2
R3
R4
R5
R6
R7
R8
R9
C1
C2
C3
C4
L1
L2
L3
A
B
D
E
F
H
26
28
30
32
34
36

NEAR-RANGE PERSONNEL BEACON LOCATOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an electromagnetic radiation detection device, and in particular to a near-range personnel beacon locator apparatus.

In the area of personnel survival indicating devices, there exists the need and capability to be able to identify and locate accidently activated emergency radio beacons. These personnel survival beacons are installed in the parachutes which are worn by aircrews. During storage on the ground in either an aircraft or in a storage building, it is possible to accidently activate one or more of the emergency beacons. If the activated beacon is not discovered and de-activated it is highly likely that its effectiveness and usefullness may be totally compromised should use of the beacon be required. Therefore, it is necessary to have the capability to rapidly establish that a beacon has been activated and to identify and locate the offending unit. The presently available equipment permits search personnel to identify and locate an activated beacon to a particular aircraft or building. However, once the general area or location of the offender has been established, it is necessary to physically check each and every unit in the vicinity until the activated unit is found. The present apparatus provides a locating device which will quickly identify and isolate the offending activated unit.

SUMMARY OF THE INVENTION

The present invention utilizes a tuned radio-frequency energy detector circuit that converts the RF energy from an activated survial beacon to a corresponding DC level. The DC level is applied to a variable duty cycle timer circuit whose output drives a light emitting diode indicator. The varying rate of flash of the light emitting diode indicator is proportional to the distance that the locator apparatus is to the activated beacon. The present apparatus further includes a regulated power supply and a light emitting/zener diode network to indicate the state of charge of the battery.

It is one object of the present invention therefore, to provide an improved personnel beacon locator apparatus wherein the varying flash rate of the LED indicator is proportional to the distance to the activated device.

It is another object of the invention to provide an improved personnel beacon locator apparatus which detects and converts the RF energy from an activated device in order to establish its location.

It is yet another object of the invention to provide an improved personnel beacon locator apparatus having a near and far range mode of operation in order to further facilitate the location of an activated survival beacon.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
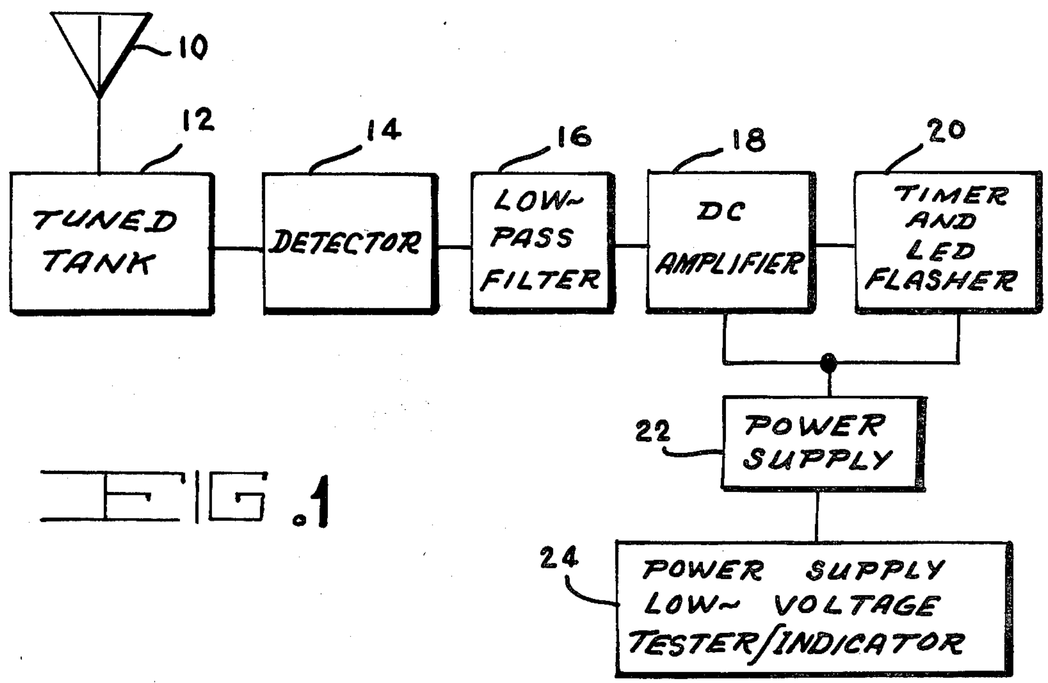
FIG. 1 is a block diagram of the personnel beacon locator apparatus according to the present invention.

Referring now to FIG. 1, there is shown therein a block diagram of the personnel beacon locator apparatus utilizing an antenna 10 in conjunction with the tuned tank circuit 12 to receive the RF signals from an activated survival beacon. The RF energy is detected in detector unit 14, filtered by low pass filter unit 16 and applied to DC amplifier unit 18. The output from the DC amplifier unit 18 is applied to a variable duty cycle timer 20 whose output drives a light emitting diode (LED) indicator. The pulse width output from the timer unit 20 varies directly with the level of the applied DC voltage. The DC voltage is proportional to the received RF energy level which in turn is proportional to the distance to the activated personnel beacon. A power supply 22 provides the regulated voltages to the DC amplifier unit 18 and the timer and LED flasher unit 20. A power supply tester/indicator unit 24 is provided to test the voltage state of the power supply and to provide an indication of that state.

Figure 2:
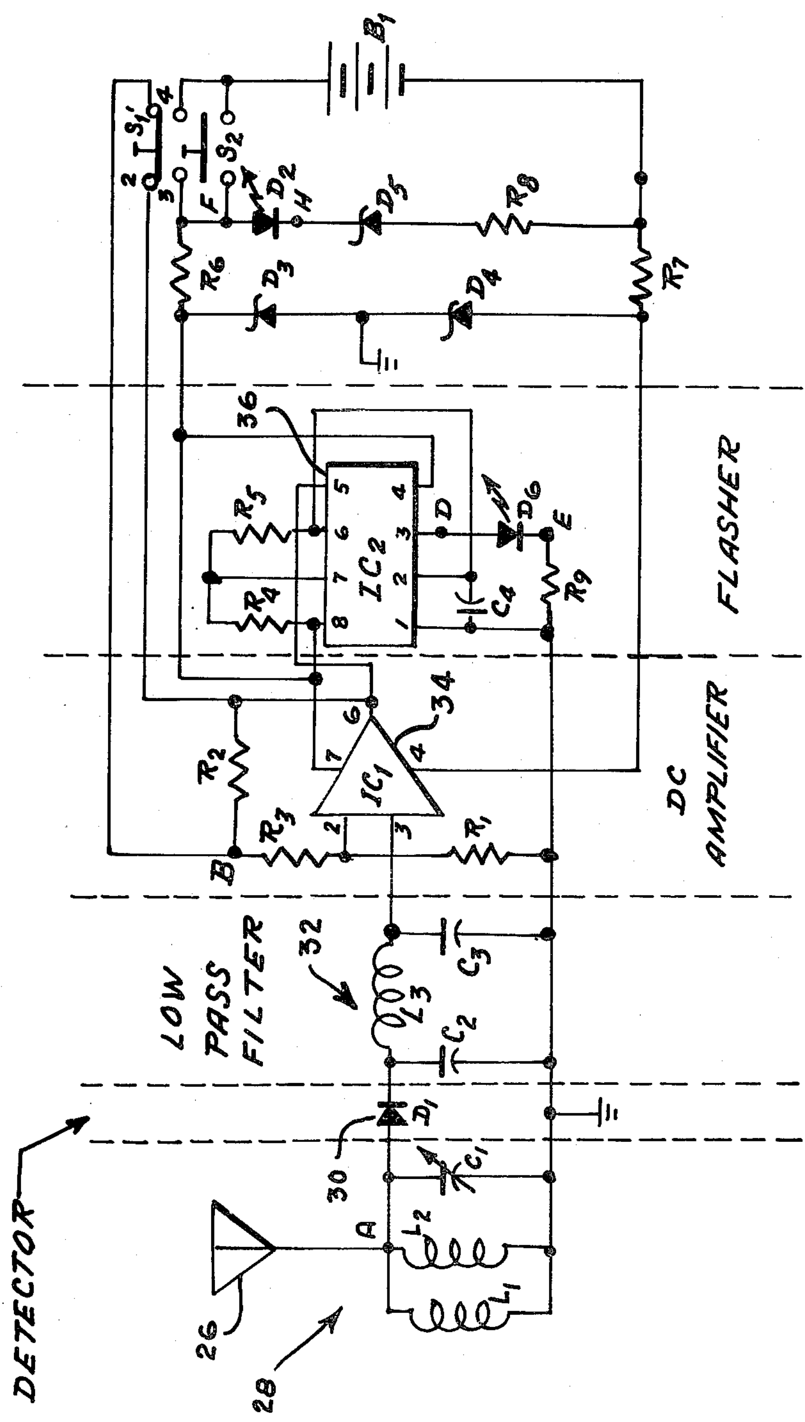
FIG. 2 is a schematic diagram of the personnel beacon locator apparatus.

Turning now to FIG. 2, therein is shown a schematic diagram of the near-range personnel beacon locator apparatus utilizing an antenna 26 which is connected to a tuned tank circuit 28 to receive the RF energy from an accidently activated survival beacon. The tuned tank circuit 28 is comprised of inductors $L_1$, $L_2$ and variable capacitor $C_1$. For the present example, the tank circuit 28 is tuned to 243.0 MHz by adjusting capacitor $C_1$ while providing a 243.0 MHz signal from a variable output signal generator. The diode 30 which comprises the detector unit, is connected between the tank circuit 28 and the low pass filter unit 32. The low pass filter unit 32 is comprised capacitors $C_2$, $C_3$ and inductor $L_3$. The output of the low pass filter unit 32 is connected directly to the input of a variable gain operational amplifier unit 34. The gain of the amplifier 34 may be varied in the present illustration between either of two fixed values which controlled by the presence or absence of the resistor $R_2$ in the operational amplifier feedback circuit. A double pole single throw momentary contact push-button switch, $S_1$ is shown connected across resistor $R_2$. The switch $S_1$ is shown in its normally closed position in which case the resistor $R_2$ is not in the feedback circuit. When the switch $S_1$ is depressed the locator apparatus is in the far range or high gain mode. The flasher unit 36 which is the variable duty cycle timer for driving a light emitting diode $D_6$, is connected to receive the DC output from the amplifier unit 34. The flashing or blink rate of the LED indicator, $D_6$, varies proportionally with the distance the locator apparatus is from the activated beacon, thus providing a visual indication to an operator attempting to locate an activated beacon. The regulated power supply is comprised of zener diodes $D_3$, $D_4$, resistors $R_6$, $R_7$ and battery $B_1$. The zener diodes $D_3$, $D_4$ are 6.3 volt zeners connected to provide +6 volts to the amplifier unit 34 and +6 volts to the flasher unit 36. The power supply tester/indicator unit is comprised of LED, $D_2$, zener diode $D_5$ and resistor, $R_8$. The power supply tester/indicator unit is operational when switch, S2, a single pole single throw momentary contact push-button switch which is shown in the normally open state, is closed. Closing switch $S_2$ also provides operation of the beacon locator apparatus in the near range or lower gain mode. Closing switch S1 also provides operation of power supply tester/indicator, and operates the beacon locator apparatus in the far range or higher gain mode.

Figure 3:
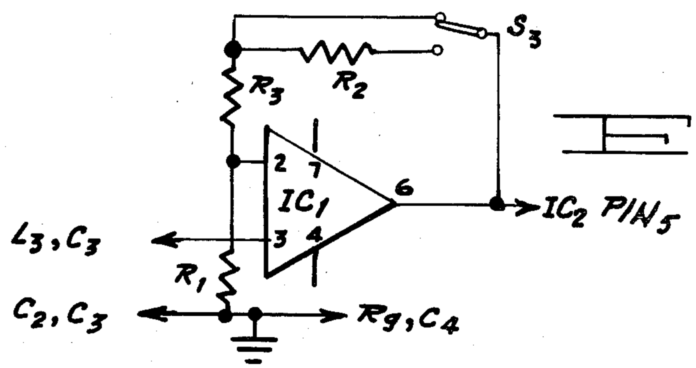
FIGS. 3 and 4 are schematic diagrams illustrating circuit variations for the circuit shown in FIG. 2.
Figure 4:
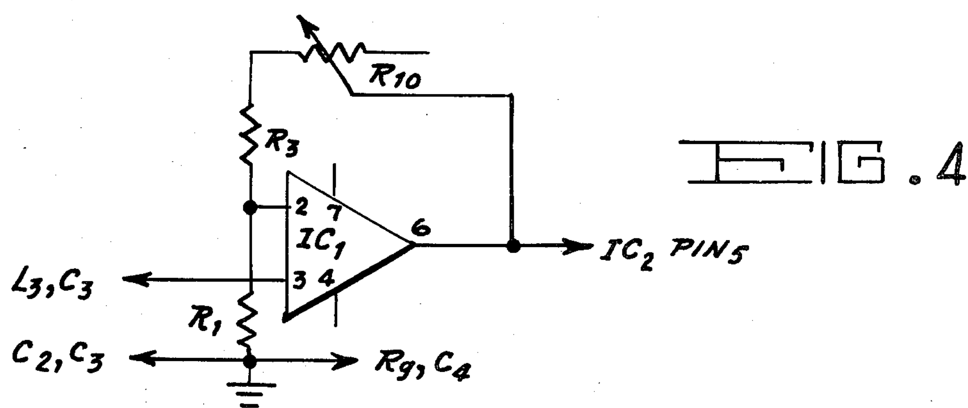

There is shown in FIG. 3 a variation of the near-range personnel beacon locator apparatus wherein a toggle switch, $S_3$ is utilized in amplifier unit 34, also shwon in FIG. 2, to control the gain of the amplifier. In FIG. 4, there is shown a further variation of the basic apparatus of FIG. 2 wherein resistor, $R_2$ has been replaced with a potentiometer, $R_{10}$. The use of a potentiometer permits the gain of amplifier unit 34 to vary from a maximum or minimum and to any point therein between.

Although the invention has been described with reference to a particular embodiment, it will be understood to those skilled in the art that the invention is capable of a variety of alternative embodiments within the spirit and scope of the appended claims.

What is claimed is:

1. A personnel beacon locator apparatus comprising in combination:

an antenna and tuned tank circuit to receive an RF signal, said RF signal being radiated by an accidently activated survival beacon, a detector unit connected to said tuned tank circuit to detect said RF signal, said detector unit providing a detected RF output signal, a low pass filter unit connected to said detector unit to filter said detected RF output signal, said low pass filter unit providing a filtered output signal, an operational amplifier connected to said low pass filter unit to receive said filtered output signal, said operational amplifier having a variable gain, said operational amplifier amplifying said filtered output signal to provide a DC level, said DC level being proportional to the distance to said activated survival beacon, a timer unit connected to said operational amplifier to receive said DC level, said timer unit having a variable duty cycle, said timer unit providing a pulsed output signal, said pulsed output signal having a variable pulse width, said pulse width varying in response to the level of said DC level, said pulsed output signal driving an LED indicator, said LED indicator blinking at a rate proportional to the diatance to said activated survival beacon, and, a power supply unit connected to said operational amplifier and timer units to supply DC voltages thereto.

2. A personnel beacon locator apparatus as described in claim 1 further including power supply regulating means wherein said DC voltages to said operational amplifier and said timer unit are held substantially constant regardless of the load being drawn by this apparatus, as long as the battery voltage exceeds the sum of zener voltage in said power supply.

3. A personnel beacon locator apparatus as described in claim 1 further including a power supply tester/indicator means, said power supply tester/indicator means testing said power supply unit during operation to indicate the adequate voltage level of said power supply unit.

4. A personnel beacon locator apparatus as described in claim 1 wherein said duty cycle of said timer unit varies directly with said DC level.

5. A personnel beacon locator apparatus as described in claim 1 wherein said RF signal has a frequency of 243.0 MHz., and by retuning said tank circuit, said personnel beacon locator apparatus can be used to detect RF signals at other frequencies.

6. A personnel beacon locator apparatus as described in claim 1 further including means for varying the gain of said operational amplifier, said gain varying means being connected to said operational amplifier to vary the gain thereof between two discrete values.

7. A personnel beacon locator apparatus as described in claim 6 wherein said gain varying means varies the gain of said operational amplifier between its maximum and minimum in number of finite increments.

* * * * *